United States Patent
Bolivar

(10) Patent No.: US 7,870,031 B2
(45) Date of Patent: Jan. 11, 2011

(54) SUGGESTED ITEM CATEGORY SYSTEMS AND METHODS

(75) Inventor: Alvaro Bolivar, Santa Clara, CA (US)

(73) Assignee: eBay Inc., San Jose, CA (US)

( * ) Notice: Subject to any disclaimer, the term of this patent is extended or adjusted under 35 U.S.C. 154(b) by 1417 days.

(21) Appl. No.: 11/316,183

(22) Filed: Dec. 22, 2005

(65) Prior Publication Data

US 2007/0150365 A1    Jun. 28, 2007

(51) Int. Cl.
*G06Q 30/00*    (2006.01)
(52) U.S. Cl. .......................... 705/26; 705/37
(58) Field of Classification Search .............. 705/26, 705/37
See application file for complete search history.

(56) References Cited

U.S. PATENT DOCUMENTS

| | | | |
|---|---|---|---|
| 6,078,866 A | 6/2000 | Buck et al. | |
| 6,253,188 B1 | 6/2001 | Witek et al. | |
| 6,269,361 B1 | 7/2001 | Davis et al. | |
| 6,535,888 B1 | 3/2003 | Vijayan et al. | |
| 6,549,904 B1 | 4/2003 | Ortega et al. | |
| 6,671,674 B1 | 12/2003 | Anderson et al. | |
| 6,701,313 B1 | 3/2004 | Smith | |
| 6,751,621 B1 | 6/2004 | Calistri-Yeh et al. | |
| 6,785,671 B1 | 8/2004 | Bailey et al. | |
| 6,829,606 B2 * | 12/2004 | Ripley ........................... | 1/1 |
| 6,850,940 B2 | 2/2005 | Wesinger, Jr. et al. | |
| 6,892,193 B2 | 5/2005 | Bolle et al. | |
| 7,039,860 B1 | 5/2006 | Gautestad | |
| 7,043,483 B2 | 5/2006 | Colace et al. | |
| 7,062,453 B1 | 6/2006 | Clarke | |
| 7,225,182 B2 | 5/2007 | Paine et al. | |
| 7,472,077 B2 | 12/2008 | Roseman et al. | |
| 7,509,315 B1 * | 3/2009 | Alpert et al. .................... | 1/1 |
| 2001/0042064 A1 | 11/2001 | Davis et al. | |
| 2001/0044758 A1 | 11/2001 | Talib et al. | |
| 2002/0120506 A1 | 8/2002 | Hagen | |
| 2002/0120619 A1 | 8/2002 | Marso et al. | |
| 2002/0169760 A1 | 11/2002 | Cheung et al. | |

(Continued)

FOREIGN PATENT DOCUMENTS

WO    WO-02054292 A2    7/2002

(Continued)

OTHER PUBLICATIONS

"U.S. Appl. No. 10/454,454, Final Office Actiom mailed Aug. 23, 2006", 13 pgs.

(Continued)

*Primary Examiner*—James Zurita
(74) *Attorney, Agent, or Firm*—Schwegman, Lundberg & Woessner, P.A.

(57) ABSTRACT

A method and a system that associate items offered by sellers and others with selected categories within a network-based system are provided. The method and system may operate to include receiving a request including an item identification having at least one token, parsing the item identification to identify the token, and assigning a token weight to the token based on a total number of items offered at a site and a number of items offered at the site and associated with the token.

27 Claims, 6 Drawing Sheets

U.S. PATENT DOCUMENTS

| | | | |
|---|---|---|---|
| 2003/0050914 | A1 | 3/2003 | Bachman et al. |
| 2003/0115116 | A1 | 6/2003 | Crampton |
| 2003/0172082 | A1 | 9/2003 | Benoit et al. |
| 2003/0172357 | A1 | 9/2003 | Kao et al. |
| 2003/0233350 | A1 | 12/2003 | Dedhia et al. |
| 2004/0068413 | A1 | 4/2004 | Musgrove et al. |
| 2004/0139059 | A1 | 7/2004 | Conroy et al. |
| 2004/0249794 | A1 | 12/2004 | Nelson et al. |
| 2004/0260604 | A1 | 12/2004 | Bedingfield et al. |
| 2004/0260621 | A1 | 12/2004 | Foster et al. |
| 2005/0273378 | A1 | 12/2005 | MacDonald-Korth et al. |

FOREIGN PATENT DOCUMENTS

| | | | |
|---|---|---|---|
| WO | WO-2004111772 | A2 | 12/2004 |
| WO | WO-2007078560 | A2 | 7/2007 |
| WO | WO-2007078560 | A3 | 7/2007 |

OTHER PUBLICATIONS

"U.S. Appl. No. 10/454,454, Final Office Action mailed Apr. 20, 2005", 10 pgs.

"U.S. Appl. No. 10/454,454, Non-Final Office Action mailed Jan. 11, 2006", 11 pgs.

"U.S. Appl. No. 10/454,454, Non-Final Office Action mailed Aug. 24, 2007", 14 pgs.

"U.S. Appl. No. 10/454,454, Non-Final Office Action mailed Dec. 3, 2004", 9 pgs.

"U.S. Appl. No. 10/454,454, Response filed Jan. 13, 2005 to Non-Final Office Action mailed Dec. 3, 2004", 12 pgs.

"U.S. Appl. No. 10/454,454, Response filed Jun. 12, 2006 to Non-Final Office Action mailed Jan. 11, 2006", 19 pgs.

"U.S. Appl. No. 10/454,454, Response filed Jul. 15, 2005 to Final Office Action mailed Apr. 20, 2005", 15 pgs.

"U.S. Appl. No. 10/454,454, Response filed Oct. 23, 2006 to Final Office Action mailed Aug. 23, 2006", 18 pgs.

Mok, Ho Kwan, "Cooperative Database Systems for Advanced Applications", *An intelligent agent for Web advertisements The Proceedings of the Third International Symposium on* Apr. 23-24, 2001, 102-109.

Schafer, J, et al., "E-commerce recommendation applications", *Data Mining and Knowledge Discovery*, 5(1-2), (2001), 115-153.

"International Search Report, for Application No. PCT/US04/17533, date mailed Dec. 9, 2004", 14 pages.

"U.S. Appl. No. 10/454,454, Examiner Interview Summary mailed Apr. 15, 2008", 2 pgs.

"U.S. Appl. No. 10/454,454, Final Office Action mailed Jun. 9, 2010", 21 pgs.

"U.S. Appl. No. 10/454,454, Non-Final Office Action mailed Dec. 16, 2009", 16 Pgs.

"U.S. Appl. No. 10/454,454, Response filed Aug. 24, 2009 to Non Final Office Action mailed Jul. 24, 2009", 12 pgs.

"U.S. Appl. No. 10/454,454, Response filed Mar. 10, 2010 to Non Final Office Action mailed Dec. 16, 2009", 15 pgs.

\* cited by examiner

SUGGESTED ITEM CATEGORY SYSTEMS AND METHODS

FIELD

The material disclosed herein relates generally to the field of data processing. More particularly, the disclosure relates to on-line data processing, including transactions such as auctions and direct sales, with respect to categorizing items, such as goods and services, offered for sale within a network-based system.

BACKGROUND

Providers of network-based commerce systems typically request potential sellers of goods and services to provide detailed information regarding the items they wish to offer for sale over the network. However, if the process of providing that information becomes unduly burdensome, the seller may be tempted to abort the process prior to completion, cutting off any opportunity to complete an actual sales transaction, and resulting in a loss of revenue to the system provider.

Items for sale on a network are typically associated with categories (or "categorized") so that potential buyers can select them quickly from among many choices. The technical challenge lies in efficiently categorizing numerous items offered for sale with a minimum of seller-provided information. If, as is typically the case, the seller is required to negotiate a lengthy listing of categories and sub-categories in an attempt to manually locate those that are most appropriate for a particular item, the process of doing so may be prematurely terminated by the frustrated seller. Thus, there is a need for improved systems and methods that minimize the amount of seller interaction required to determine appropriate categories to associate with items offered for sale in a network-based commerce system.

SUMMARY

According to one example embodiment, a system to suggest categories to associate with items offered for sale on a network is provided. The system includes an interface to receive a request including at least one seller item identification, and a ranking module to calculate rank histograms corresponding to matching categories (perhaps included in one or more leaf categories) derived from at least one token weight corresponding to at least one token (included in the seller item identification) and the number of items for sale at the seller site.

According to a further example embodiment, a method of suggesting categories to associate with items offered for sale on a network is provided. The method includes receiving a request including a seller item identification having at least one token, parsing the seller item identification to identify the at least one token, and assigning a token weight to the at least one token based on a total number of items for sale at the seller site and a number of items for sale at the seller site associated with the at least one token.

Other features of the various embodiments of the invention will be apparent from the accompanying drawings and from the detailed description that follows.

BRIEF DESCRIPTION OF THE DRAWINGS

Embodiments of the invention are illustrated by way of example and not limitation in the figures of the accompanying drawings, in which like references indicate similar elements and in which.

DETAILED DESCRIPTION

A system and method to suggest categories for association with items offered for sale within a network-based commerce system are described. In the following description, for purposes of explanation, numerous specific details are set forth in order to provide a thorough understanding of the various embodiments. It will be evident, however, to one skilled in the art that many of the embodiments described may be practiced without these specific details. In the description, "items" or "offerings" include both goods and services to be offered for sale, offered for sale, or sold in a network-based commerce system and/or e-commerce environment.

Platform Architecture

Figure 1:
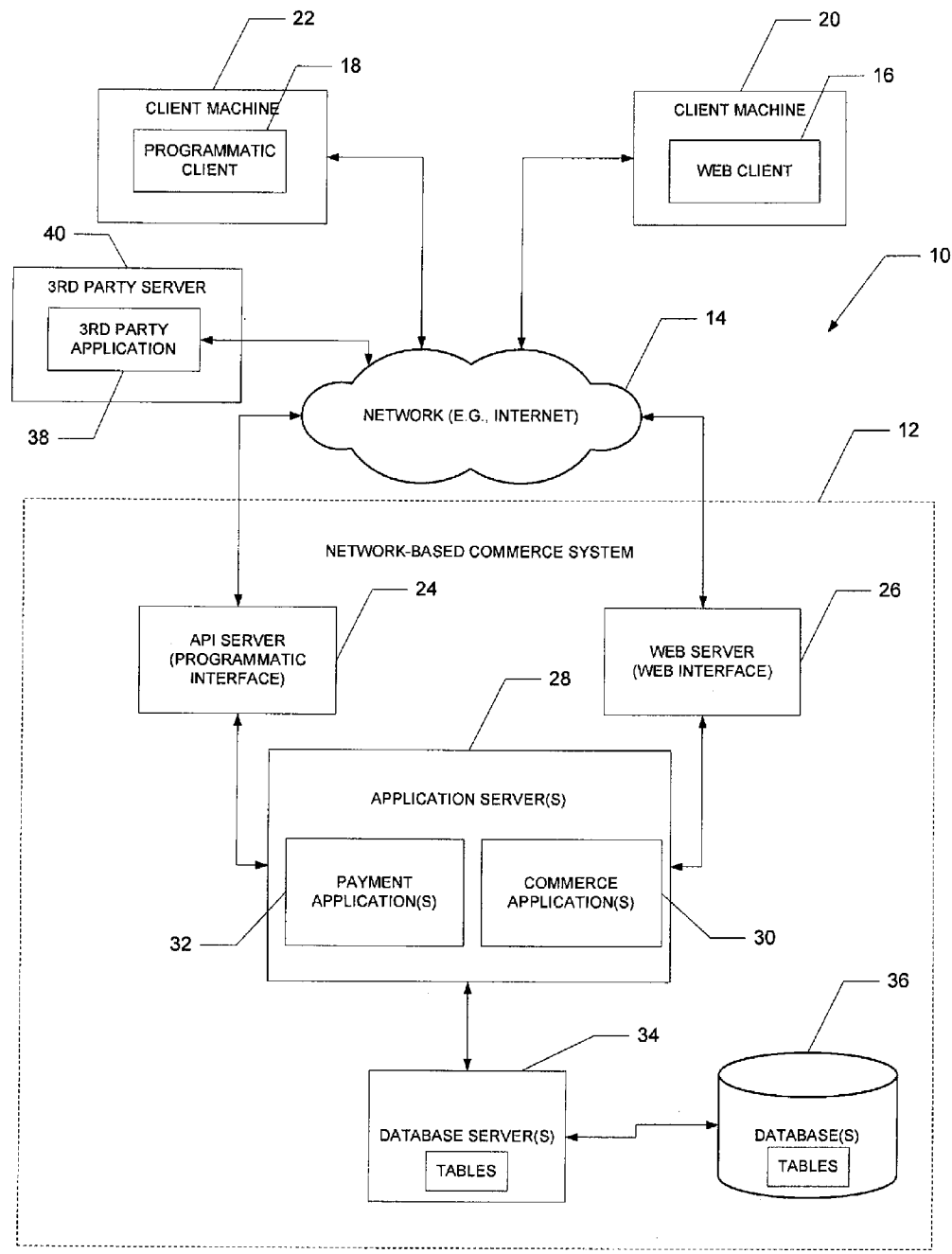
FIG. 1 is a is a network diagram depicting a system, according to one example embodiment of the invention.

FIG. 1 is a network diagram depicting a system 10, according to one example embodiment of the invention, using a client-server architecture. A network-based commerce system 12 (e.g., a network-based commerce system facilitating transactions between multiple sellers and multiple buyers) provides server-side functionality, via a network 14 (e.g., the Internet) to one or more clients, such as a web client 16 (e.g., a browser, such as the Internet Explorer browser developed by Microsoft Corporation of Redmond, Wash. or the FireFox browser provided by Mozilla Corporation of Mountain View, Calif.), and a programmatic client 18 executing on respective client machines 20 and 22. Each of the clients 16 or 18 may further include (or provide access to) communications applications (e.g., email, instant messaging, text chat, or Voice over IP (VoIP) applications), enabling users of the commerce system 12 to communicate.

An Application Program Interface (API) server 24 and a web server 26 may be coupled, and provide program and web interfaces respectively, to one or more application servers 28. The application servers 28 may host one or more commerce applications 30 and payment applications 32. The application servers 28 may, in turn, be coupled to one or more databases servers 34 that facilitate access to one or more databases 36.

The commerce applications 30 provide a number of commerce functions and services to users that access the commerce system 12. The payment applications 32 likewise provide a number of payment services and functions to those users. For example, the payment applications 32 may allow users to qualify for, and accumulate, value (e.g., in a commercial currency, such as the U.S. dollar, or a proprietary currency, such as "points") in accounts, and then later to redeem the accumulated value for products (e.g., goods or services) that are made available via the commerce applications 30. While the commerce and payment applications 30 and 32 shown in FIG. 1 form part of the network-based commerce system 12, it will be appreciated that, in alternative embodiments of the invention, the payment applications 32 may form part of a payment service that is separate and distinct from the commerce system 12.

Further, while the system 10 shown in FIG. 1 employs a client-server architecture, embodiments of the invention are not limited to such, and may just as well utilize a distributed, or peer-to-peer, architecture. The various commerce and payment applications 30 and 32 can also be implemented as standalone software programs, with or without individual networking capabilities.

The web client 16 may access the various commerce and payment applications 30 and 32 via the web interface supported by the web server 26. Similarly, the programmatic client 18 can access the various services and functions provided by the commerce and payment applications 30 and 32 via the program interface of the API server 24. The programmatic client 18 may, for example, comprise a seller application (e.g., the TurboLister application developed by eBay Inc., of San Jose, Calif.) to enable sellers to author and manage listings on the commerce system 12 in an off-line manner, and to perform batch-mode communications between the programmatic client 18 and the network-based commerce system 12.

A third party application 38, executing on a third party server machine 40, may also have programmed (e.g., computer-implemented) access to the network-based commerce system 12 via the program interface of the API server 24. For example, the third party application 38 may, utilizing information retrieved from the network-based commerce system 12, support one or more features or functions on a website hosted by the third party. The third party website may, for example, provide one or more promotional, commerce, or payment functions that are supported by the relevant applications of the network-based commerce system 12.

Commerce Applications

Figure 2:
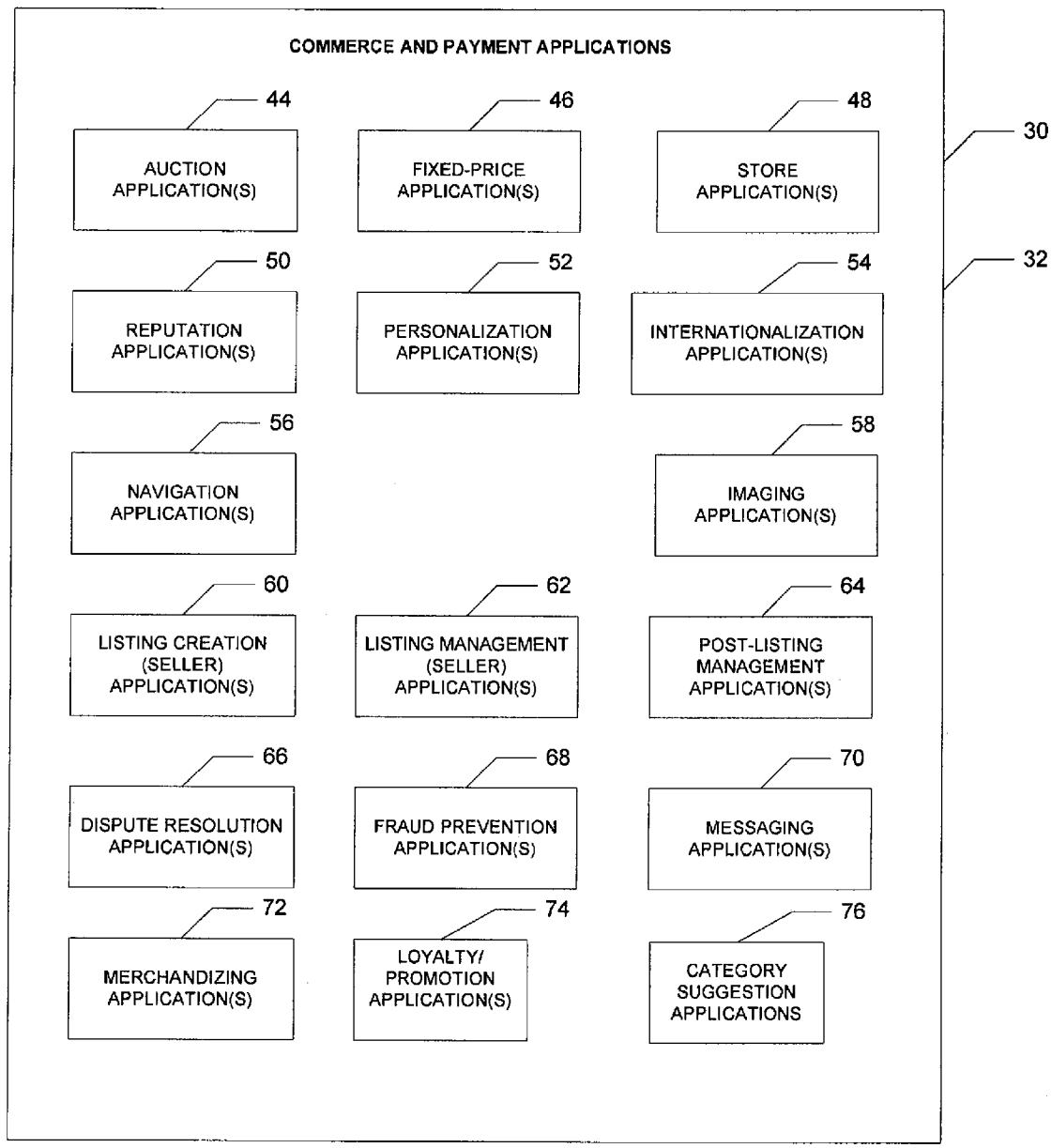
FIG. 2 is a block diagram illustrating multiple commerce and payment applications.

FIG. 2 is a block diagram illustrating multiple commerce and payment applications 30 and 32 that, in an example embodiment of the invention, are provided as part of the network-based commerce system 12. The commerce system 12 may provide a number of listing and price-setting mechanisms whereby a seller may list items, e.g., goods or services, for sale, a buyer can express interest in or indicate a desire to purchase such items, and a price can be set for a transaction associated with the items. To this end, the commerce applications 30 are shown to include one or more auction applications 44 which support auction-format listing and price setting mechanisms (e.g., English, Dutch, Sealed First Price, Vickrey, Chinese, Japanese, Double, and Reverse auctions etc.) The various auction applications 44 may also provide a number of features in support of such auction-format listings, such as a reserve price specification feature whereby a seller may specify a reserve price in association with a listing and a proxy-bidding feature whereby a bidder may invoke automated proxy bidding.

A number of fixed-price applications 46 may support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with an auction-format listing, and allow a buyer to purchase goods or services, which are also being offered for sale via an auction, for a fixed-price that is typically higher than the starting price of the auction.

Store applications 48 allow sellers to group their listings within a "virtual" store, which may be branded and otherwise personalized by and for the sellers. Such a virtual store may also offer promotions, incentives and features that are specific and personalized to a relevant seller.

Reputation applications 50 allow parties that engage in transactions utilizing the network-based commerce system 12 to establish, build, and maintain reputations, which may be made available and published to potential trading partners. For example, where the network-based commerce system 12 supports person-to-person trading, users may have no history or other reference information whereby the trustworthiness and credibility of potential trading partners may be assessed. The reputation applications 50 allow a user, for example through feedback provided by other transaction partners, to establish a reputation within the network-based commerce system 12 over time. Other potential trading partners may then reference the established reputation to assess credibility and trustworthiness.

Personalization applications 52 allow users of the commerce system 12 to personalize various aspects of their interactions with the commerce system 12. For example a user may, utilizing an appropriate personalization application 52, create a personalized reference page where information regarding transactions, to which the user is (or has been) a party, may be viewed. Further, a personalization application 52 may enable a user to personalize listings and other aspects of their interactions with the commerce system 12 and other parties.

In one embodiment, the network-based commerce system 12 may support a number of commerce systems that are customized, for example, for specific geographic regions. Thus, a version of the commerce system 12 may be customized for the United Kingdom, whereas another version of the commerce system 12 may be customized for the United States. Each of these versions may operate as an independent commerce system 12, or may be provided as customized (or internationalized) presentations associated with a single common underlying commerce system 12.

Navigating the network-based commerce system 12 can be facilitated by one or more navigation applications 56. For example, a search application may enable key word searches of listings published via the commerce system 12. A browser application may permit users to browse various category, catalogue, or inventory data structures that operate to classify listings within the commerce system 12. Various other navigation applications may be provided to supplement the search and browsing applications.

In order to make item listings available via the network-based commerce system 12 as informative and visually attractive as possible, the commerce applications 30 may include one or more imaging applications 58 that can be used to upload images for inclusion within item listings. An imaging application 58 may also operate to incorporate images within viewed listings. The imaging applications 58 can support one or more promotional features, including image galleries that are presented to potential buyers. For example, sellers may pay an additional fee to have an image included within a gallery of images for promoted items.

Listing creation applications 60 may allow sellers to author listings having information associated with selected goods or services that are to be offered for sale as part of transactions conducted within the commerce system 12. These listing creation applications 60 may receive offer data associated with offerings from a plurality of potential sellers.

Listing management applications 62 allow sellers to manage one or more of the listings that may have been created using a variety of mechanisms, including the listing creation applications 60 described above. Specifically, where a particular seller has authored and/or published a large number of listings, the management of such listings may present a challenge. The listing management applications 62 may provide a number of features (e.g., auto-relisting, inventory level monitors, etc.) to assist the seller in managing such listings. One or more post-listing management applications 64 can also assist sellers with a number of activities that typically occur after an item or service has been sold. For example, upon completion of an auction facilitated by one or more auction applications 44, a seller may wish to leave feedback regarding a particular buyer that can be accessed by other users of the system 12. To this end, a post-listing management application 64 may provide an interface to one or more reputation applications 50, as a convenient way for the seller to provide feedback regarding one or more buyers which have interacted with that seller.

Dispute resolution applications 66 provide a mechanism to resolve disputes arising between parties to a transaction. For example, the dispute resolution applications 66 may provide guided procedures whereby the parties are led through a number of activities in an attempt to settle a dispute. In the event that a particular dispute cannot be settled via the guided procedures, the dispute may be passed on to a third party mediator or arbitrator for resolution. Fraud prevention applications 68 may be used to implement various fraud detection and prevention mechanisms to reduce the occurrence of fraud within the commerce system 12.

Messaging applications 70 can be used to generate and deliver messages to users of the network-based commerce system 12. Such messages may be used, for example, to advise users regarding the status of item listings within the commerce system 12 (e.g., providing "you have been outbid" notices to bidders during an auction process, or to provide promotional and merchandising information to users).

Merchandising applications 72 may be used to support various merchandising functions that enable sellers to increase their level of sales via the commerce system 12. The merchandising applications 80 also operate the various merchandising features that may be invoked by sellers, and may be used to monitor the success of various merchandising strategies employed by sellers.

The network-based commerce system 12 itself, or one or more parties that enter transactions using the commerce system 12, may operate loyalty programs supported by one or more loyalty/promotions applications 74. For example, a buyer may earn loyalty or promotion points for each transaction established and/or concluded with a particular seller, and offered rewards that can be redeemed using some number of accumulated loyalty points.

Category suggestion applications 76, which may form a part of the navigation applications 56 and/or the listing creation applications 60, may be used to suggest categories of items to sellers that are most directly related to a particular item that a potential seller would like to offer for sale. Suggestions are derived from a tokenized version of an item identification received from the seller, after weights have been assigned to the tokens. The weights are based on the total number of items for sale at the seller site, and the number of items for sale at the site that are associated with one or more of the same tokens. The detailed operation of the category suggestion applications 76 is described next.

Figure 3:
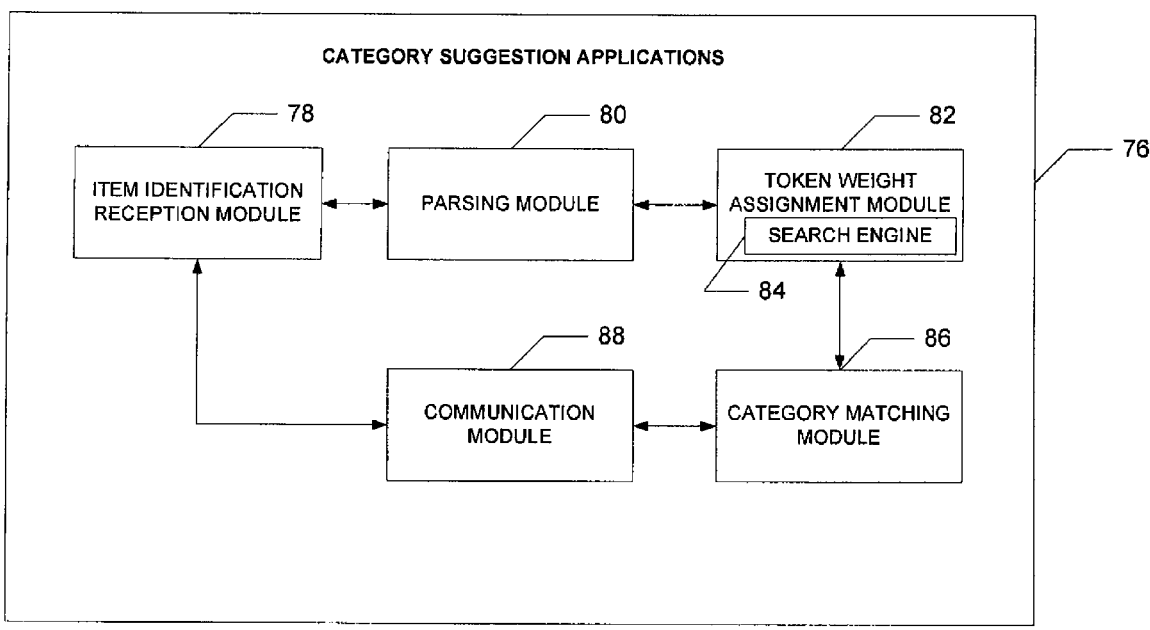
FIG. 3 is a block diagram illustrating the category suggestion applications.

FIG. 3 shows a block diagram of an item identification reception module 78, a parsing module 80, a token weight assignment module 82; a category matching module 86, and a communication module 88 that may form part of the category suggestion applications 76. The item identification reception module 78 receives a request from the potential seller that includes the seller item identification (e.g., an item title that the seller proposes to associate with the item for sale, such as "Grayco Baby Stroller"). The request may also include an identification of the seller site (e.g., "North America," or "United Kingdom," or "SYSID0001"). If no identification of the seller site is received, the identity of the seller site may be assumed by the system 12.

The parsing module 80 may receive the seller item identification from the item identification reception module and operate to tokenize the item identification. For example, if the item identification is "A-1 Grayco® Baby Stroller" then the resulting tokens produced by the parsing module might be: "a" and "1" and "grayco" and "baby" and "stroller". That is, the tokenizing process may operate to accomplish any of the following actions: (a) remove all non-alphanumeric characters from the item identification; (b) change any upper-case characters to lower-case characters; (c) extract the remaining individual terms as tokens. Since tokenization is a language-dependent process, tokenizing an item identification given in a language other then English may involve further or different actions, known to those of skill in the art.

The token weight assignment module 82 can then operate on the individual tokens to assign weights to them. The tokens and their weights are subsequently used to determine categories that are most appropriate to the item to be offered for sale by the seller. The details of assigning weights to tokens will be described in detail below. A search engine component 84 may be included in the token weight assignment module to calculate the token weights and to locate items throughout the system 12 that have assigned tokens in common with the tokens extracted from the seller item identification. The search engine component 84 may comprise any number and type of search engines known to those of skill in the art.

The category matching module 86 may operate to use the tokens, their weights, and the site identity to select item categories that match most closely, or are most appropriate for association with, the item identified by the seller. As will be explained in further detail below, item categories may include sub-categories and leaf categories. Rank histograms corresponding to matching categories included in the leaf categories, and selected or derived from the token weights, may be calculated by processors included in the system 12. The details of determining matching categories and calculating the rank histograms will also be described in detail below.

The communication module 88, which may form a part of the messaging applications 70 (shown in FIG. 2), may be used to communicate requests, or parts of requests (e.g., the item identification, such as the item title; and the seller site identification) to the item identification reception module 78. The communication module 88 may also be used to receive and communicate matching category suggestions (as provided by the category matching module 86) to the seller, from which the seller may choose. The matching categories may be displayed in histogram form, as described in more detail below.

Thus, referring now to FIGS. 1, 2, and 3, in some embodiments, a system 12 may include an interface (e.g., as part of the web server 26 or the item identification reception module 78) to receive requests including seller item identifications, and perhaps identifications of corresponding seller sites. The interface may comprise a network communications interface, such as a computer, a server, or a network interface card, either wired or wireless.

Figure 6:
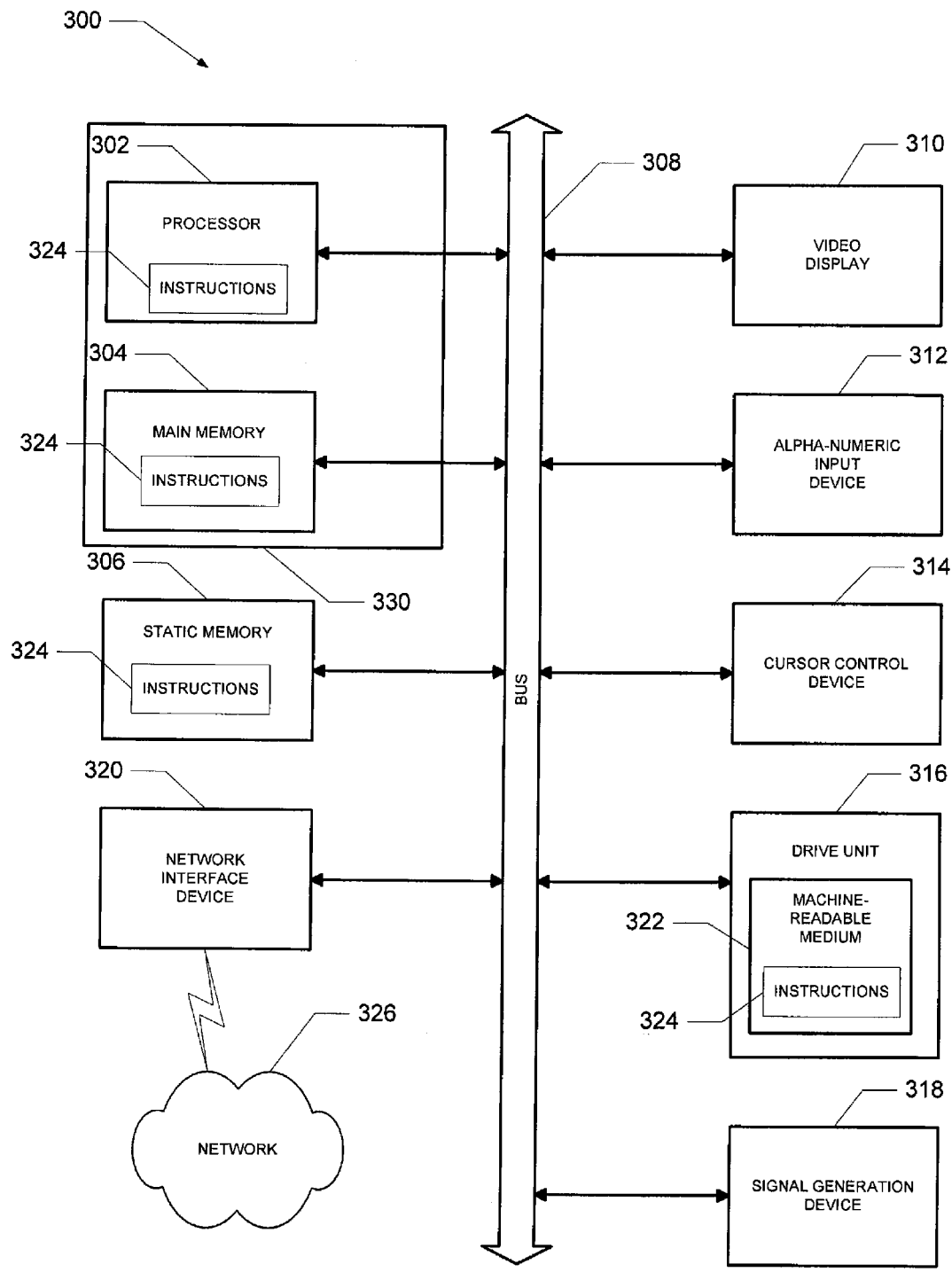
FIG. 6 is a block diagram of a machine for performing any one of the example methods described herein.

The system 12 may also include one or more modules (e.g., such as a ranking module 330 shown in FIG. 6, perhaps included as part of the application server(s) 28) to calculate rank histograms corresponding to matching categories included in the leaf categories and derived from one or more token weights corresponding to the tokens included in the seller item identification, and a number of items for sale at the seller site.

Figure 4:
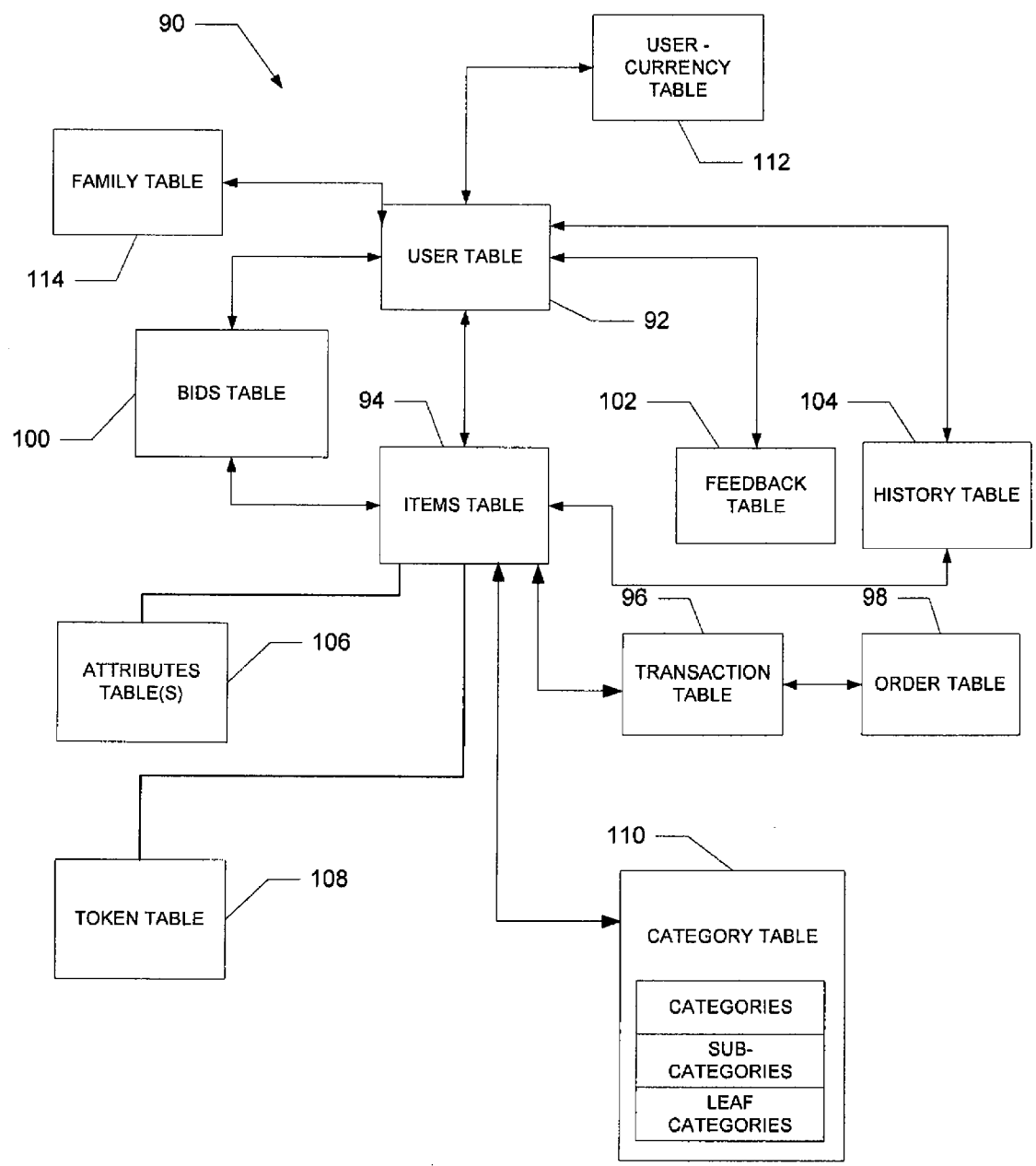
FIG. 4 is a high-level tabular entity relationship diagram.

In some embodiments, the system 12 may include one or more database components, including tables (e.g., the tables 90 shown in FIG. 4 which may be stored and accessed as part of the database server(s) 34 and/or database(s) 36 of FIG. 1) including a plurality of main categories, sub-categories, and a list of the leaf categories. The system 12 may also include a search engine component (e.g., search engine component 84) to locate items in the matching categories included in the leaf categories.

Various parts of the system 12 may be used to store different types of data. For example, in some embodiments, the system 12 may have one or more servers (e.g., database server(s) 34 in FIG. 1) that include the category listing tree. The system 12 may also have one or more servers that include the interface to receive the request from the seller (e.g., the web server 26 in FIG. 1). Many other arrangements are possible.

Data Structures

FIG. 4 is a high-level entity-relationship diagram, illustrating various tables 90 that may be maintained within the database servers 34 and databases 36, and that are utilized by the commerce and payment applications 30 and 32. A user table 92 may contain one or more records for each registered user of the network-based commerce system 12, and may include identifier, address and financial instrument information pertaining to each such registered user. A user may, it will be appreciated, operate as a seller, a buyer, or both, within the network-based commerce system 12. In one example embodiment of the invention, a buyer is a user that has accumulated value (e.g., commercial or proprietary currency), and is then able to exchange the accumulated value for items that are offered for sale within the network-based commerce system 12. In addition, and/or in the alternative, a user may also be a seller. In one example embodiment of the invention, a seller is a user that has at least one item to offer for sale within the network-based commerce system 12. At different times, sellers may register as buyers, and buyers may register as sellers. Separate tables may be maintained for buyers and sellers.

The tables 90 also include an items table 94 in which are maintained item records for offerings, i.e. goods and services that are available to be, or have been, sold, via the commerce system 12. Each item record within the items table 94 may furthermore be linked to one or more user records within the user table 92, so as to associate a seller and one or more actual or potential buyers with each item record. Each item record includes offer data which includes seller identification data (linked or obtained from the user table 92) and offering identification data that provides detailed information on each offering, such as the seller item identification. For example, a description of the goods or service offered or sold (e.g., item title) may be provided, together with a photograph or other information relating to the offering.

A transaction table 96 contains a record for each transaction (e.g., a purchase transaction) pertaining to items for which records exist within the items table 94.

An order table 98 is populated with order records, each order record being associated with an order. Each order, in turn, may be associated with one or more transactions for which records exist within the transactions table 96.

Bid records within a bids table 100 each relate to a bid received at the network-based commerce system 12 in connection with an auction-format listing supported by an auction application 44. Bid data typically includes item identification data, which may be obtained from or linked to the items table 94. Bid data also includes a bid amount. A feedback table 102 may be utilized by one or more reputation applications 50 (see FIG. 2), in one example embodiment, to construct and maintain user reputation information. A history table 104 may be used to maintain a history of transactions to which a user has been a party. One or more attributes tables 106 may be used to record attribute information pertaining to items for which records exist within the items table 94. Considering a single example of such an attribute, the attributes tables 106 may indicate a brand attribute associated with a particular item, the brand attribute identifying a licensor or manufacturer of the relevant item as specified by a seller. Other attributes may include size, shape, color, construction material, country of manufacture, etc.

The token table 108 may be populated with tokens used by the system 12 and available for matching with tokens provided by the parsing module 80 (see FIG. 3). The token table 108 may include associations with, links to, or lists of items in the items table 94 that correspond to each of the tokens in the token table 108.

The category table 110 may be populated with categories, sub-categories, and leaf categories with which items for sale may be associated, and which buyers may use to search for items of particular interest. One example of a category is "clothing and accessories." Others, include, but are certainly not limited to: "computers and office equipment," "motor vehicles," and "toys." The categories may be accessible in the form of a category listing tree, including sub-categories. To further the example, sub-categories for the "computers and office equipment" category may include, but are not limited to: "laptop computers" and "desktop computers". Leaf categories for laptop computers may include, but are not limited to: "14" screen or smaller" and "15" screen or larger." As is the case with the token table 108, the category table 110 may include associations with, links to, or lists of items in the items table 94 that correspond to each of the categories, sub-categories, and leaf categories in the category table 108. Thus, in some embodiments, the system 12 may include a category listing tree including leaf categories.

Thus, myriad embodiments may be realized. For example, referring now to FIGS. 1-4, it can be seen that a system 12 may include a means to receive requests that have seller item identifications including one or more tokens. Such means may include a web server (e.g., web server 26 shown in FIG. 1) and/or a reception module (e.g., the item identification reception module 78 shown in FIG. 3).

The system 12 may also include a means to parse the seller item identification to identify the tokens included in the seller item identification. Such means may include the parsing module 80 shown in FIG. 3, among others.

The system 12 may include a means to assign token weights to the tokens extracted from the seller item identification via parsing, perhaps based on a total number of items for sale at the seller site, and a number of items for sale at the seller site that have been associated with one or more of the tokens. Such means may include a token weight assignment module 82 and/or a search engine component 84, as shown in FIG. 3, among others.

In some embodiments, the system 12 may include a database component (e.g., database(s) 36 and/or database server(s) 34) that include some or all of the items for sale at the seller site that have been associated with the tokens. The system 12 may include a search component (e.g., the navigation applications 56 shown in FIG. 1, or one or more search engine components 84 as shown in FIG. 3) to locate those items for sale at the seller site that have been associated with one or more of the tokens extracted from the seller item identification.

Flowcharts

Figure 5:
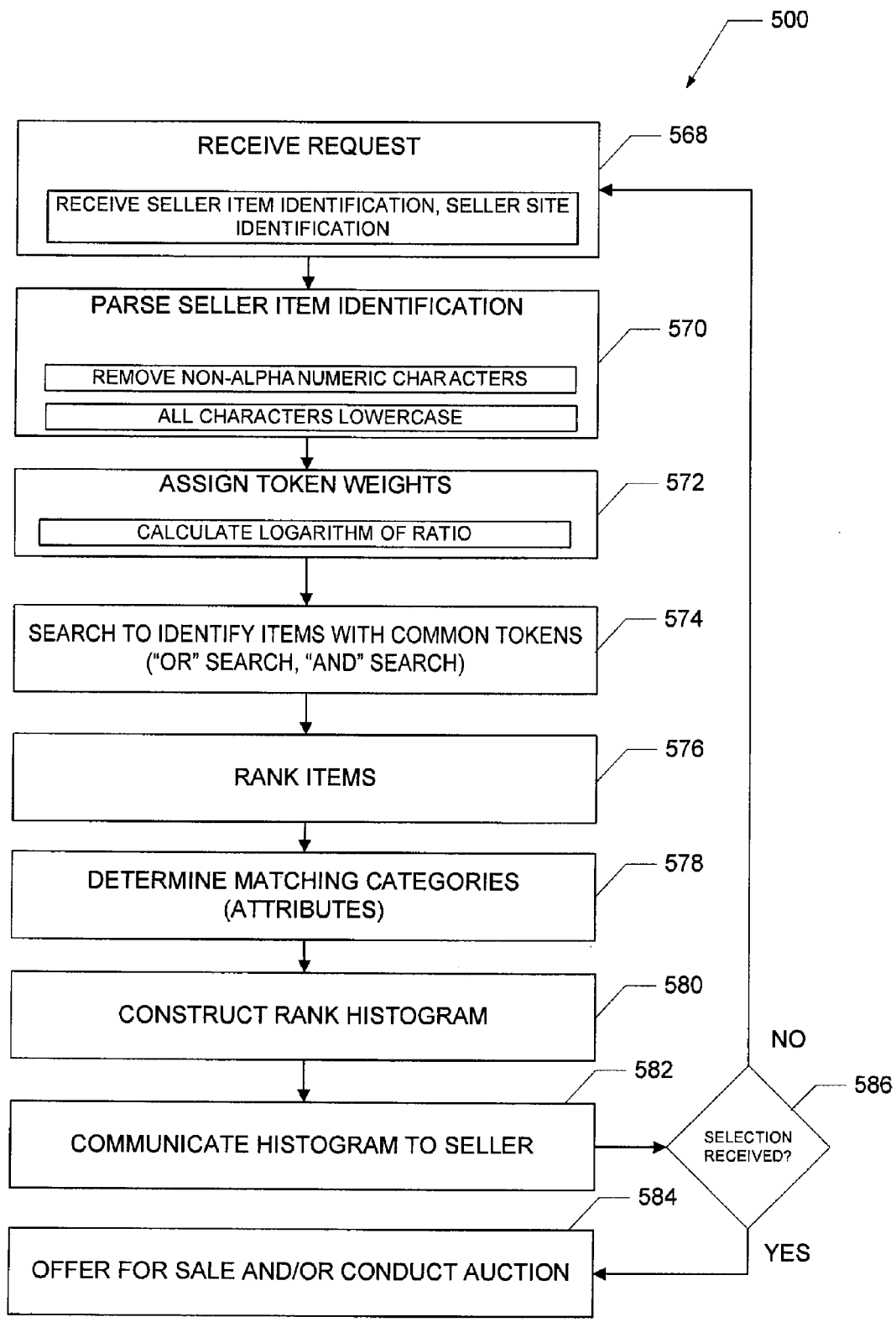
FIG. 5 is a high-level flowchart of several methods according to various embodiments of the invention.

A method of using a network-based commerce system 12 to determine matching category suggestions for association with items offered for sale within the system 12 is described below according to the flowchart of FIG. 5. The method 500, which may comprise a computer-implemented method, may begin with receiving a request including the seller item identification at block 568. The request may also include the seller site identification, such as "eBay United States" or "eBay Japan." Thus, receiving the request as part of the method 500 may further include receiving an identification of the seller site.

The seller item identification may include one or more tokens, and may comprise the title entered by a seller to be assigned to the item to be offered for sale. For example, Table I illustrates a few examples of seller item identifications, and the equivalent token content:

TABLE I

| Item Identification | Included Tokens |
|---|---|
| Ipod Nano 5 gigs | ipod nano 5 gigs |
| The Super Star Stroller #1 | the super star stroller 1 |
| Mp-3 Player @rocks.com | mp 3 player rocks com |
| A Great New Dream | a great new dream |

At block 570, the seller item identification (e.g., the item title) may be tokenized, or partitioned into tokens. As noted previously, the process of tokenizing the seller item identification may include removing all non-alphanumeric characters and/ or converting all characters to lower-case characters. Thus, the method 500 may include parsing the seller item identification to identify one or more tokens, which may in turn include removing non-alphanumeric characters from the item identification or tokens (if the tokens have already been extracted by parsing), and/or converting all remaining characters in the item identification or tokens to lower case characters. Examples of the tokenizing process result are shown in the right hand column of Table I.

After the tokens are extracted from the seller item identification, a numeric weight may be assigned to each token. At block 572, the weights are assigned to each token extracted from the seller item identification. The numeric weight for each token may be taken as the ratio of the total number of items in the collection of all items offered for sale (optionally including those items at auction) to the number of items that include at least one of the tokens extracted from the seller item identification in their own identification information. The weight for a token may also comprise the logarithm of the ratio described, such as the $\log_2$, the $\log_e$, or the $\log_{10}$ of the ratio of the total number of items in the collection of all items offered for sale (or at auction, or both) to the number of items that includes at least one of the tokens extracted from the seller item identification in their own identification information.

For example, if the tokens extracted from the seller item identification (e.g., an item having a title of "Ipod Nano 5 Gigs") were: "ipod" and "nano" and "5 gigs," and there are 10 million total items for sale, with the number of items for sale having "ipod" as a token being 1 million, the number of items having "nano" as a token being 0.5 million, and the number of items having "5 gigs" as a token being 10,000, then the token weights assigned to the tokens "ipod" might be $\log_2(10/1)=$ 3.32, and "nano" might be $\log_2(10/0.5)=4.32$, and "5 gigs" might be $\log_2(10/0.01)=9.97$ respectively. Thus, the method 500 may include assigning a token weight to one or more tokens included in the seller item identification, with each token weight based on the total number of items for sale at the seller site and the number of items for sale at the seller site that are associated with one or more of the tokens. Token weights may be derived, in some embodiments, from the number of items for sale at the seller site having a title that includes one or more of the tokens that have been extracted from the seller item identification. Assigning the token weights may further include calculating a logarithm of the ratio of the total number of items for sale at the seller site and the number of items for sale at the seller site associated with each one of the tokens.

At block 574 a search may be conducted to locate items in the system 12 that have tokens in common with those extracted from the seller item identification at block 570. Different types of searches may be conducted, perhaps based upon the number of tokens that have been extracted from the seller item identification.

For example, the designer of the system 12 may decide that if the number of tokens in the seller item identification is less then a certain number (e.g., less than 10, 5, 3, or 2), then an "AND" search query will be conducted. That is, only items that have all of the extracted tokens associated with them will be located. Thus, the method 500 may include conducting a search to identify a plurality of items which have at least one assigned token in common with one or more tokens included in the seller item identification. The method may further include conducting an "AND" search query, perhaps using a search engine, to identify a plurality of items which have at least one assigned token in common with the tokens extracted from the seller item identification if there are less than a preselected number of token weights included in the plurality of token weights. Otherwise, an "OR" search query may be conducted. That is, items having any of the extracted tokens associated with them may be located.

In some embodiments, a weighted "OR" search will be conducted. In this case, every item having a weighted sum of associated tokens with equal or lower weight than the sum of the extracted token weights may be located. Thus, the method 500 may include an "OR" search query comprising a weighted search query based on a plurality of token weights.

All of the items for sale (or with sales completed or auctions completed, or any one or combination of these) may now be ranked at block 576. Each item may be assigned a score that is the sum of the weights of the tokens each item has in common with the item identified by the seller in block 568 (this may be the same score used to conduct the weighted "OR" search described above). For example, given the sample token weights shown above, items having both "ipod" and "nano" as part of their seller item identification might have a score or token sum of $3.32+4.32=7.64$. Items having "nano" and "5 gigs" as part of their seller item identification might have a score or token sum of $4.32+9.97=14.29$. Items having all three tokens as part of their seller item identification might have a score or token sum of $3.32+4.32+9.97=17.61$. Items having none of the tokens as part of their seller item identification might have a score of zero. Items that have more terms in their identification information may have larger scores simply because there is a greater potential to have matching tokens. Token weights are relative to the frequencies of the words among each other, but ultimately, probabilistically, the co-occurrence of tokens is of greater importance.

Thus, in theory, if the items listed in table 94 (see FIG. 4) are ranked, the more similar an item identification for items in the table is to the item identified by the seller at block 568, the higher the score assigned to the item in the table 94 (see FIG. 4) will be. In some embodiments, this may mean the more similar a title for an item in the items table 94 (see FIG. 4) is to that of the item identified by the seller at block 568, the higher the score assigned to the item in the table 94 (see FIG. 4) will be. Thus, as a result, highly similar items should have substantially similar scores. All of the items at the seller site (e.g., all items in the table 94 shown in FIG. 4) can be effectively ranked using this set of operations. So, using the sample figures given above, at this point in the process there would be a list of 10 million ranked items. Most would likely have a score of zero.

The matching categories can then be determined at block 578. With some number N of the highest-scoring ranked items selected, the categories that have already been associated with those items can be determined. For example, N may be selected as 10, 50, 100, 500, or 1000 (or any number desired, depending on the computation time and precision desired). Thus, the method 500 may include ranking a plurality of items for sale using a token sum of corresponding item identifications.

A histogram of the categories associated with the top N items can now be calculated at block 580. The categories listed most frequently may be listed at the top of the histogram, followed by categories that appear less frequently, and so on, up to some selected number of categories. As a result, the most appropriate categories that should be associated with the item identified by the seller at block 568 (i.e., those most directly related) will be listed near or at the top of the histogram. Thus, the method 500 may also include determining a number of categories associated with the highest-ranked preselected number of the plurality of items (e.g., the most frequently-occurring five or ten, or indeed, any number of categories may be selected). The method 500 may also include constructing a rank histogram of the selected number of categories.

If desired, the operations described with respect to tokens at blocks 578 and 580 may also be conducted with respect to item attributes. As noted previously, an attribute is a feature associated with a selected item that operates to includes the selected item as a member of a particular set or group. For example, considering a particular category, such as the "shoes" category, one attribute might be color, another attribute might be size, another attribute might be brand, and so forth. As another example, in the category of "jewelry," attributes might include, but not be limited to: stone type, cut, quality, and setting. As is the case with categories, myriad variations are possible. Thus, the method 500 may include ranking a plurality of items using a token sum of corresponding item identifications, and determining a number of attributes associated with a highest-ranked preselected number N of the plurality of items.

After items have been ranked based on token weights at block 576, matching attributes can be determined at block 578 by locating the attributes associated with the highest N ranking items determined at block 576. In the same way that a histogram can be constructed based on associated categories, a histogram can also be constructed based on attributes. Thus, the attributes listed most frequently may be listed at the top of the histogram, followed by attributes that appear less frequently, and so on, for some selected number of attributes that arise as a result of locating the N ranking items. As a result, the most appropriate attributes that should be associated with the item identified by the seller at block 568 will be listed near or at the top of the histogram. Thus, the method 500 may also include determining a number of attributes associated with the highest-ranked preselected number of the plurality of items (e.g., the most frequently-occurring five or ten, or indeed, any number of attributes may be selected). The method 500 may also include constructing a rank histogram of the selected number of attributes.

At block 582 some portion or all of the histogram may be communicated to the seller, in numeric or in graphic form. If a numeric listing is used, the frequency may be noted as a percentage of the time that each category or attribute appears with respect to the N items in the ranking list, or even as a raw number of occurrence within the set of N items.

If a graphic format is used, a bar graph may be shown with each bar having a length proportional to the frequency of appearance of that category or attribute with respect to the N items in the ranking list. The numeric frequency may be noted as part of the graph. If desired, graphs of the histograms for both categories and attributes may be displayed. Thus, the method 500 may include communicating at least a portion of the rank histogram to a display (e.g., display 310 in FIG. 6).

Once the histogram has been communicated to the seller, the seller may choose one or more of the categories or attributes shown, perhaps by clicking a mouse on a graphical user interface that forms a part of the communication module 86 (see FIG. 3). If no selection is received at block 586, or if the seller so elects, a new request including a new seller item identification can be made at this time, and the method 500 may continue with the operations of block 568. Of course, the seller may also elect to pursue a more traditional route to category or attribute selection, including manual selection.

If the seller does select one or more of the categories and/or attributes communicated at block 582, then the method 500 may continue at block 584, with offering the item identified by the seller for sale, or conducting an auction to sell the item. Thus, the method 500 may include receiving the selection of one or more sales categories to be associated with the seller identification, wherein the selected sales categories are included in the number of categories communicated to the seller as part of the histogram display. The method 500 may also include receiving a selection of one or more attributes to be associated with the seller identification, wherein the selected attributes are included in the number of attributes reported to the seller as part of the histogram display. The method 500 may also include conducting an on-line auction within a network-based commerce system 12 with respect to a plurality of products including at least one item associated with the seller item identification.

FIG. 6 shows a block diagram of a machine in the example form of a computer system 300 within which a set of instructions 324, for causing the machine to perform any one or more of the methods discussed herein, may be stored, accessed, and executed. In alternative embodiments, the machine operates as a standalone device or may be connected (e.g., networked) to other machines. In a networked deployment, the machine may operate in the capacity of a server machine, or as a client machine in server-client network environment, or even as a peer machine in a peer-to-peer (or distributed) network environment. The machine may comprise a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential, in parallel, or otherwise) that specify actions to be taken by that machine. Further, while only a single machine is illustrated, the term "machine" shall also be taken to include any collection of machines that individually or jointly execute a set (or multiple sets) of instructions 324 to perform any one or more of the methods discussed herein. The example computer system 300 includes one or more processors 302 (e.g., one or more central processing units (CPUs) and a graphics processing unit (GPU), or both), a main memory 304 and a static memory 306, which may communicate with each other directly, or using a bus 308. The computer system 300 may further include a video display unit 310 (e.g., a flat panel display, such as a liquid crystal display (LCD), or a cathode ray tube (CRT)). The computer system 300 may also include an alphanumeric input device 312 (e.g., a keyboard, or touch pad), a cursor control device 314 (e.g., a mouse), a disk drive unit 316, a signal generation device 318 (e.g., a speaker or headphones) and a network interface device 320. The computer system 300 may form a part of the system 10 shown in FIG. 1, including operating as part of one or more of the servers 24, 26, 28, 34, 36, and 40, and/or one or more of the machines 20 and 22. The computer system 300 may also be implemented in various configurations throughout the system 10, if so desired.

The disk drive unit 316 may include one or more machine-readable media 322 having one or more sets of instructions 324 (e.g., software) stored thereon, embodying any one or more of the methods or functions described herein. The instructions 324 may also reside, completely or at least partially, within the main memory 304 and/or within the processor 302 during execution thereof by the computer system 300, the main memory 304 and the processor 302 also constituting machine-readable media. The instructions 324 may further be transmitted or received over a network 326 via the network interface device 320.

The computer system 300 may include one or more modules 330, perhaps including one or more processors 302, memory 304, and one or more sets of instructions 324. The module 330 may comprise a ranking module, for example, that operates to calculate rank histograms corresponding to matching categories included in leaf categories (e.g., included in a category listing tree) and derived from one or more token weights corresponding to one or more tokens included in a seller item identification and a number of items for sale at a seller site. The module 330 may operate to carry out one or more actions described with respect to any of the methods detailed herein.

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions 324. The term "machine-readable medium" shall also be taken to include any medium that is capable of storing a set of instructions 324 for execution by the machine and that cause the machine to perform any one or more of the methods of the present invention. The term "machine-readable medium" shall accordingly be taken to include, but not be limited to, solid-state memories and optical media.

While the concepts related to determining matching categories discussed above have up to now been described within the context of a series of commerce transactions, there is no particular reason to limit the various embodiments in this way. That is, the general concepts can easily be adapted to situations that do not involve commerce, or are only semi-commercial. For example, instead of a request including a seller item identification, the request may include any type of item identification provided by any person or entity, such as an item to be stored or published on a web site (e.g., a poem, or book, or blog, or picture—whether offered for sale, or not). The rank histograms corresponding to matching categories may be derived from token weights corresponding to tokens taken from the provided item identification and some number of items stored, listed, or published at any web site, whether they are offered for sale, or not. That is, the universe of items used to calculate token weights may be that of items posted for publication to a site, or stored at a site, or a subset of items of a particular type that are so posted or stored (e.g., all items listed or published at a site, all pictorial objects, all textual objects, all audiovisual objects, all audio objects, etc.).

Thus, in some embodiments, the seller item identification and request may even be provided by a potential buyer, searching for items to purchase. In this case, the rank histogram reporting may be used to guide the buyer with respect to likely categories in which goods for sale may be located for purchase. Similarly, using a non-commerce example, a website viewer might offer an item identification that is tokenized and used to calculate rank histograms that lead the inquiring viewer to categories where items of greatest interest, based on the identification, may be found, and perhaps downloaded for viewing, storage, or further processing.

Thus, a system 12 and method 500 to suggest categories to associate with items offered (e.g., published, or for sale, etc.) on a network have been described. Implementing the system 12 and method 500 may result in providing improved systems and methods that minimize the amount of item provider (e.g., authors, sellers, etc.) interaction required to determine appropriate categories for association with items offered within a networked system, including a networked commerce system.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system, including:
an interface to receive a request including at least one seller item identification; and
a ranking module including a processor and a memory to calculate and display rank histograms corresponding to matching categories included in leaf categories and derived from at least one token weight corresponding to at least one token included in the seller item identification and a number of items for sale at a seller site,
wherein the at least one token weight is assigned as a ratio of a total number of items for sale at the seller site and the number of items for sale at the seller site including the at least one token.

2. The system of claim 1, wherein the request further includes:
an identification of the seller site.

3. The system of claim 1, wherein the at least one token weight is derived from a number of items for sale having a title including the at least one token at the seller site.

4. The system of claim 1, further including:
a database component including a plurality of main categories, sub-categories, and a list of the leaf categories.

5. The system of claim 1, further including:
a search engine component to locate items in the matching categories included in the leaf categories.

6. The system of claim 1, wherein the interface further includes:
a network communications interface to receive the seller item identification.

7. The system of claim 1, further including:
a server including a category listing tree including the leaf categories.

8. The system of claim 1, further including:
a first server including a category listing tree including the leaf categories; and
a second server including the interface.

9. A computer-implemented method, including:
receiving a request including a seller item identification having at least one token;
parsing the seller item identification to identify the at least one token; and
assigning a token weight by a token weight assignment module in an application server to the at least one token as a ratio of a total number of items for sale at a seller site and a number of items for sale at the seller site including the at least one token.

10. The computer-implemented method of claim 9, wherein receiving the request further includes:
receiving an identification of the seller site.

11. The computer-implemented method of claim 9, wherein parsing the item identification further includes:
removing non-alphanumeric characters from the item identification.

12. The computer-implemented method of claim 9, wherein assigning the token weight further includes:
calculating a logarithm of a ratio of the total number of items for sale at the seller site and the number of items for sale at the seller site associated with the at least one token.

13. The computer-implemented method of claim 9, further including:
conducting a search to identify a plurality of items which have one or more tokens in common with the at least one token.

14. The computer-implemented method of claim 9, further including:
ranking a plurality of items for sale using a token sum of corresponding item identifications; and
determining a number of categories associated with a highest-ranked preselected number of the plurality of items.

15. The computer-implemented method of claim 14, further including:
constructing a rank histogram of the number of categories; and
communicating at least a portion of the rank histogram to a display.

16. The computer-implemented method of claim 15, further including:
receiving a selection of a sales category to be associated with the seller identification, wherein the sales category is included in the number of categories.

17. The computer-implemented method of claim 9, further including:
ranking a plurality of items using a token sum of corresponding item identifications; and
determining a number of attributes associated with a highest-ranked preselected number of the plurality of items.

18. The computer-implemented method of claim 17, further including:
constructing a rank histogram of the number of attributes; and
communicating at least a portion of the rank histogram to a display.

19. The computer-implemented method of claim 18, further including:
receiving a selection of at least one attribute to be associated with the seller identification, wherein said at least one attribute is included in the number of attributes.

20. The computer-implemented method of claim 9, further including:
assigning a plurality of token weights including the at least one token weight to a corresponding plurality of tokens included in the item identification;
conducting an AND search query of the database to identify a plurality of items which have one or more tokens in common with the at least one token if there are less than a preselected number of token weights included in the plurality of token weights; and
otherwise conducting an OR search query of the database.

21. The computer-implemented method of claim 9, wherein the OR search query comprises a weighted search query based on the plurality of token weights.

22. The computer-implemented method of claim 9, further including:
conducting an on-line auction within a network-based commerce system with respect to a plurality of products including at least one item associated with the seller item identification.

23. A computer-readable medium having instructions stored thereon which, when executed by a computer, cause the computer to perform:
receiving a request including a seller item identification having at least one token;
parsing the seller item identification to identify the at least one token; and
assigning a token weight by a token weight assignment module in an application server to the at least one token as a ratio of a total number of items for sale at a seller site and a number of items for sale at the seller site including the at least one token.

24. A system, including:
- an item identification reception module in an application server to receive a request including a seller item identification having at least one token;
- a parsing module in the application server to parse the seller item identification to identify the at least one token; and
- a token weight assignment module in the application server to assign a token weight to the at least one token as a ratio of a total number of items for sale at a seller site and a number of items for sale at the seller site including the at least one token.

25. The system of claim 24, further including:
- a database component including at least a portion of the number of items for sale at the seller site associated with the at least one token.

26. The system of claim 24, further including:
- a search component to locate the number of items for sale at the seller site associated with the at least one token.

27. The system of claim 24, wherein the first means comprises:
- a wireless network communications interface.

* * * * *